(12) United States Patent
Delcheva et al.

(10) Patent No.: US 11,856,067 B2
(45) Date of Patent: Dec. 26, 2023

(54) METHODS AND APPARATUS TO CENTRALIZE LOCALIZATION OF MICRO-SERVICES MESSAGES IN A DISTRIBUTED CLOUD ENVIRONMENT

(71) Applicant: VMware, Inc., Palo Alto, CA (US)

(72) Inventors: Anna Milkova Delcheva, Sofia (BG);
Sibin Stilyanov Georgiev, Sofia (BG);
Boris Savov Savov, Sofia (BG);
Dimitar Ivanov Ivanov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/900,568

(22) Filed: Jun. 12, 2020

(65) Prior Publication Data

US 2021/0392190 A1    Dec. 16, 2021

(51) Int. Cl.
*H04L 67/51* (2022.01)
*H04L 67/10* (2022.01)

(52) U.S. Cl.
CPC .............. *H04L 67/51* (2022.05); *H04L 67/10* (2013.01)

(58) Field of Classification Search
CPC ......... H04L 67/16; H04L 67/10; H04L 29/08; H04L 67/51; H04L 67/306; H04L 69/22
USPC ....................................................... 709/201
See application file for complete search history.

(56) References Cited

U.S. PATENT DOCUMENTS

| | | | | |
|---|---|---|---|---|
| 2006/0074894 | A1* | 4/2006 | Remahl | G06F 16/9535 |
| 2009/0253416 | A1* | 10/2009 | Lee | H04H 60/72 |
| | | | | 455/414.1 |
| 2012/0180071 | A1* | 7/2012 | Lesandro | G06Q 10/06 |
| | | | | 719/313 |
| 2015/0304847 | A1* | 10/2015 | Gong | H04L 63/0823 |
| | | | | 455/411 |
| 2016/0112475 | A1* | 4/2016 | Lawson | H04L 65/80 |
| | | | | 709/204 |
| 2018/0004544 | A1* | 1/2018 | Vasiltschenko | G06F 9/454 |
| 2018/0027054 | A1* | 1/2018 | Toepke | H04L 69/22 |
| | | | | 709/222 |
| 2019/0182309 | A1* | 6/2019 | Koszek | H04L 69/329 |
| 2020/0296143 | A1* | 9/2020 | Mohamad Abdul | |
| | | | | H04L 65/1073 |
| 2021/0191706 | A1* | 6/2021 | Sn | G06F 9/24 |
| 2022/0124162 | A1* | 4/2022 | Zhang | H04W 4/50 |

* cited by examiner

*Primary Examiner* — Schquita D Goodwin
*Assistant Examiner* — Mehulkumar J Shah
(74) *Attorney, Agent, or Firm* — Hanley, Flight & Zimmerman, LLC

(57) ABSTRACT

Methods and apparatus to centralize localization of micro-services messages in a distributed cloud environment are disclosed. An example method includes generating, by executing an instruction with one or more processors, a plurality of messages bundles. Respective ones of the messages bundles are associated with respective ones of a plurality of micro-services. The example method further including creating a localized response based on a non-localized response to a request by a user to one of the plurality of micro-services. The localized response is based on one of the plurality of messages bundles and the one of the plurality of messages bundles corresponds to the one of the plurality of micro-services.

18 Claims, 12 Drawing Sheets

METHODS AND APPARATUS TO CENTRALIZE LOCALIZATION OF MICRO-SERVICES MESSAGES IN A DISTRIBUTED CLOUD ENVIRONMENT

FIELD OF THE DISCLOSURE

This disclosure relates generally to distributed cloud computing, and, more particularly, to methods and apparatus to centralize localization of micro-services messages in a distributed cloud environment.

BACKGROUND

Virtualizing of computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Services available in a distributed cloud environment are typically provided by way of executing multiple microservices. To achieve a particular goal (e.g., providing a service), the microservices are designed to collaborate with each other. In many examples, the services are provided to computers/processors operating in different geographical localities such that the services are tailored to provide content and/or services to the computers/processors based on the geographical locality of the computer/processor using the service.

Figure 1:
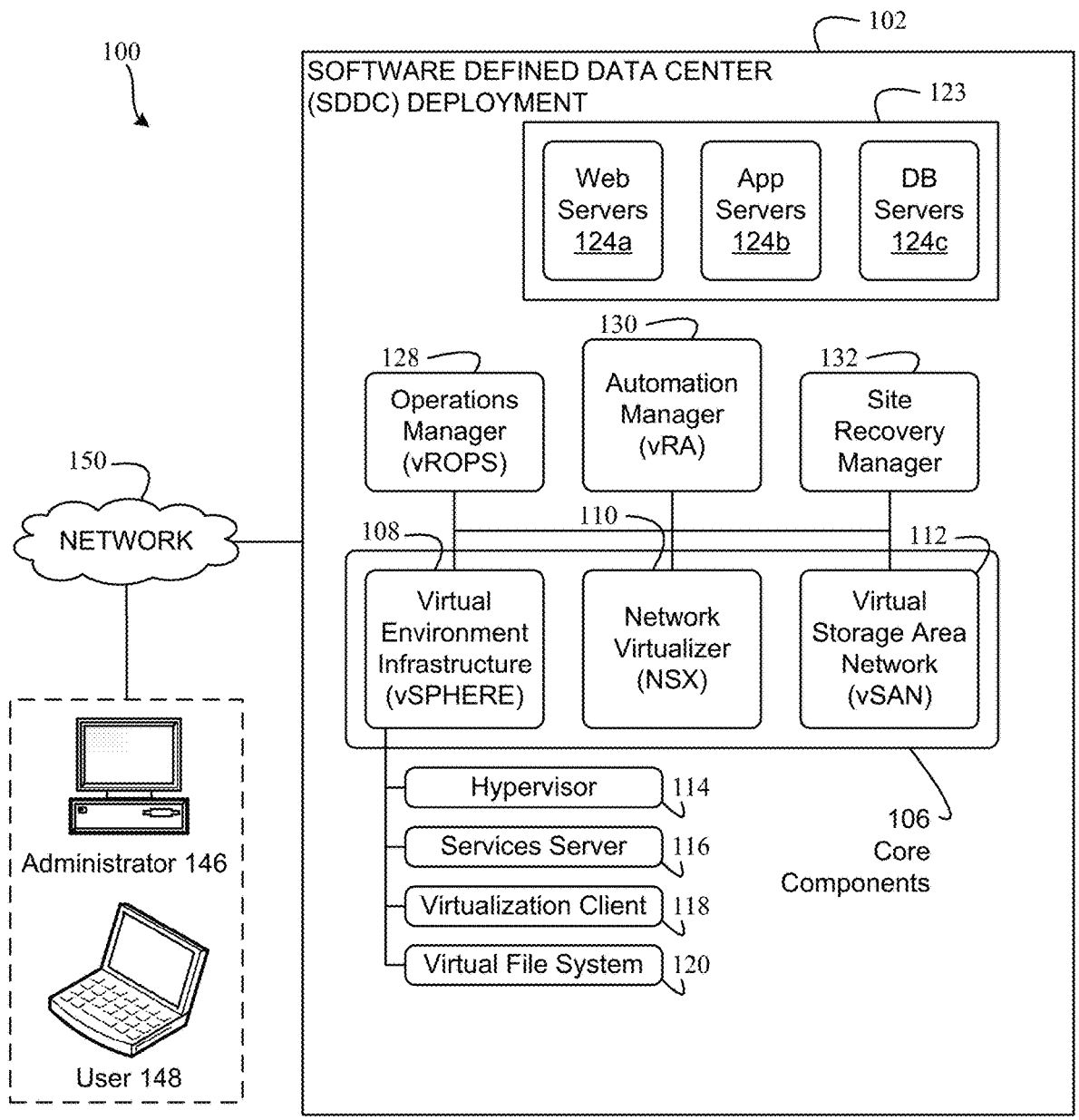
FIG. 1 illustrates an example environment of use including a software-defined data center (SDDC) implemented in accordance with the teachings of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing platforms may provide many powerful capabilities for performing computing operations/services. However, taking advantage of these computing capabilities/services manually may be complex and/or require significant training and/or expertise. Prior techniques for providing cloud computing platforms and services often require customers to understand details and configurations of hardware and software resources to establish and configure the cloud computing platform.

Often, services available in a distributed cloud environment are provided by way of executing multiple microservices. To achieve a particular goal, for example, executing a provisioning service, the microservices collaborate with each other. In many examples, the services are provided to computers/processors operating in different geographical localities such that the services need to be tailored to provide content and/or services to the computers/processors based on the geographical locality of the computer/processor using the service. In conventional distributed cloud environments, all of the services require a two-way communication contract by which a localization setting is passed between the cloud-based service provider and a user of the service. A localization setting identifies, for example, a geographical location of a computer operated by the user of the system. If such a two-way communication contract is not available or fails to identify a localization setting of the computer operated by the user, an identity service is used to identify the localization of the computer operated by the user. Unfortunately, the usage of a two-way communication contract or to access an identity service adds additional time when a user attempts to access any of the multiple services via a communication. Further, with the availability of multiple services, the amount of overhead spent in processing communication requests for each service based on a need to perform the two-way communication contract and/or go to an identity service requires a consumption of processing resources that grows with the number of users accessing services and the number of services available to users of the services. Methods and apparatus disclosed herein lessen the amount of time and resources spent on determining a localization setting for users of an available service.

A software-defined data center (SDDC) is a data storage facility implemented using an infrastructure that is virtualized and delivered as a service to one or more customers. After deployment of a SDDC, the SDDC provides policy-driven automation to enable provisioning and ongoing management of logical compute resources, storage resources, and network resources. For example, customers may select/create policies that cause the SDDC to deploy applications quickly based on policy-driven provisioning that dynamically matches resources to continually changing workloads and business demands. An SDDC can be deployed as a private cloud, a hybrid cloud, or a public cloud and can run on multiple hardware stacks, hypervisors, and clouds.

A virtual machine (VM) is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein add custom headers to service requests sent by users of a service to the service. The custom headers provide a localization setting, thereby eliminating the need for the service to determine the localization setting for each request by accessing an identity service. Instead, the service relies on the localization setting included in the custom header when providing a response to the request. The localization setting can include not only a geographical location of the computer from which the request is received but also a language associated with the computer based on the location or based on a user preference associated with the user. In some examples, a custom header can include a string such as "en-US,en;q=0.5" which can indicate that the preferred language is English as used in the United States. In some examples, the q value (e.g., "q=0.5") can represent a relative quality factor for media types identified as preferred by, for example, the user.

The methods and apparatus to provide centralized localization services in micro-services of a distributed cloud environment disclosed herein may be operated in any (and in some examples a combination) of a number of virtualized cloud environments including, for example, full virtualization, paravirtualization, and operating system virtualization.

FIG. 1 illustrates an example environment of use 100 including a software-defined data center (SDDC) 102 implemented in accordance with the teachings of this disclosure. The example SDDC 102 of the illustrated example of FIG. 1 includes example core components 106, example deployed servers 123, an example operations manager 128, an example automation manager 130, an example site recovery manager 132, and an example token issuer 160. An example administrator 146 and/or user operating a computer device 148 accesses the SDDC 102 via a network 150.

The example core components 106 of the illustrated example include a virtual environment infrastructure 108, an example network virtualizer 110, and an example virtual storage area network 112. The example virtual environment infrastructure 108 is an example virtualization platform that includes an example hypervisor 114, an example services server 116, an example virtualization client 118, and example virtual file system 120. In the illustrated example, the virtual environment infrastructure 108 may be implemented using the vSphere virtualization suite developed and sold by VMware® of Palo Alto, California, United States. The example hypervisor 114 may be implemented using the VMware ESXi™ hypervisor developed and sold by VMware® The example services server 116 may be implemented using the VMware vCenter® Server developed and sold by VMware® The example virtualization client 118 may be implemented using the VMware vSphere® client developed and sold by VMware®. The example virtual file system 120 may be implemented using the VMware vSphere Virtual Machine File System developed and sold by VMware®. Additionally, or alternatively, some or all of the components of the virtual environment infrastructure 108 may be implemented using products, software, systems, hardware, etc. from companies other than VMware. In other examples, the virtual environment infrastructure 108 may include additional or different components other than those shown in FIG. 1.

The example network virtualizer 110 is a network virtualization platform that may be used to provide virtual network resources for network computing environments. The example network virtualizer 110 may be implemented using the VMware NSX® network virtualization platform developed and sold by VMware®. The example virtual storage area network 112 is a data storage virtualization platform that may be used to provide virtual data store resources for network computing environments. The example virtual storage area network 112 may be implemented using the VMware® Virtual SAN™ (vSAN) software-defined storage platform developed and sold by VMware®. Additionally, or alternatively, the network virtualizer 110 and/or the virtual storage area network 112 may be implemented using products from companies other than VMware®.

In the illustrated example of FIG. 1, one or more VMs (or containers) are used to implement the deployed servers 123.

In the illustrated example, the servers 123 include one or more example web servers 124a, one or more example app servers 124b, and one or more database (DB) servers 124c. The servers 123 are deployed and/or configured by one or more of an example operations manager 128, an example automation manager 130, and an example site recovery manager 132. The example operations manager 128 is provided to automate information technology (IT) operations management of the SDDC 102 to run the servers 123. The example operations manager 128 may be implemented using the VMware® vRealize® Operations (vROPS) IT Operations Management product developed and sold by VMware®. The example operations manager 128 is provided to automate responsive actions to business needs in real-time to deliver personalized infrastructure, applications, and IT operations when business needs arise within the SDDC 102. The example automation manager 130 may be implemented using the VMware's vRealize® Automation (vRA) product developed and sold by VMware®. The example site recovery manager 132 is provided to implement different levels of availability of the SDDC 102 for different servers 123. For example, some servers 123 may require higher levels of redundancy or network rerouting capabilities to ensure a higher level of availability for services (e.g., access to the servers 123 and/or underlying data) even during resource failures. In some examples, other, non-critical servers 123 may only require low to moderate availability. The example site recovery manager 132 may be implemented using the VMware® Site Recovery Manager Disaster Recovery Software developed and sold by VMware®.

In some examples, the automation manager 130 operates to automate services provided via the SDDC 102 including a centralized localization service. In some examples, the centralized localization service is implemented by the collaboration of an example provisioning service, an example cloud services platform (CSP) developed and sold by VMware®, an example localization system and an example provisioning user interface service. While in the illustrated example of FIG. 1, the automation manager 130 is shown as a component of the SDDC 102, in some examples, the automation manager 130 may be implemented externally to the SDDC.

In some examples, multiple operations performed by the above-identified services may need to be performed sequentially within the context of the centralized localization service. For example, a response to a user request is provided after such a request is received.

Example approaches disclosed herein augment the functionality of the automation manager 130 by centralizing a localization service provided to multiple users located in multiple locales. In some such examples approaches, the centralized localization service operates to register users of the service along with locale information, to respond to requests generated by a user of the service by checking the request for localization information, and, if such information is included, using the localization information to generate a response to the request that is appropriate (e.g., is provided in a language associated with a locale in which the user is located). Thus, the centralized localization service enables the provision of an appropriate response to a user request while eliminating the need to check a user profile associated with a request received from a user each time such a request is received. As used herein, a messages bundle is a collection of text files (e.g., properties files) containing key-value pairs (e.g., properties). In some examples, one properties file is created for each language or locale that the multi-service centralized location service is to support. In some examples, one properties file is created for each micro-service. In some examples, the properties file includes locale identifiers associated with a user's language/regional preferences. Such locale identifiers are supported by the multi-centralized location service. In some examples, a property file can be used to identify a default locale to be used when a user's profile does not exist. In some examples, the properties file is an example default file that an Administration Console can use if a user has not specified a locale. Further, in some examples, a locale or locale identifier represents a specific geographical, political, or cultural region. An operation that requires a locale to perform its task is called locale-sensitive and uses the locale identifier to tailor information for the user. For example, displaying a number is a locale-sensitive operation—the number should be formatted according to the customs/conventions of the user's native country, region, or culture. In some examples, when a user profile specifies a locale, then a user can log into a browser located anywhere in the world and the information will still be tailored to the customs and conventions of the user's country/region and not the location of the browser. Greater detail regarding the information messages bundles is provided in connection with the description of the localization controller of FIG. 5.

Figure 2:
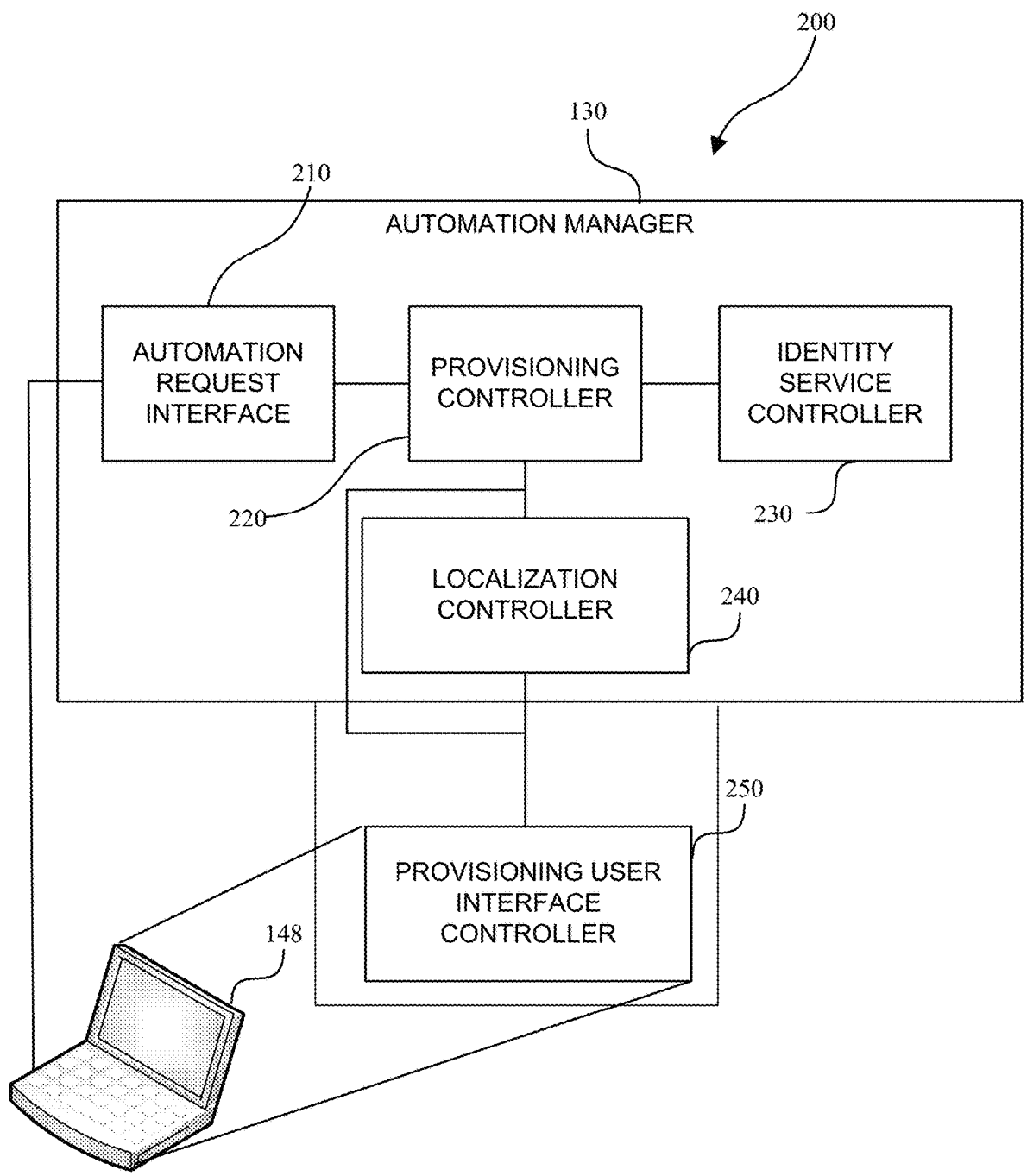
FIG. 2 is a block diagram of the example automation manager of the example SDDC of FIG. 1.

FIG. 2 is a block diagram of an example implementation of the automation manager 130 of FIG. 1 configured to support an example multi-service centralized localization service 200 disclosed herein. The example automation manager 130 of the illustrated example of FIG. 2 includes an example automation request interface 210, an example provisioning controller 220, an example cloud service platform based identity service controller (identity service controller) 230, and an example localization controller 240. In some examples, the automation manager 130 includes an example provisioning user interface controller 250 that executes on an example user computer 148 (see also FIG. 1) based at an example geographical location to which the example multi-service centralized localization service is to be provided. In some examples, the provisioning controller 220 is coupled to the localization controller 240 and to the provisioning user interface controller 250. In some examples, the provisioning controller 220 communicates with the provisioning user interface controller 250 via the localization controller 240. In some examples, the provisioning user interface controller 250 is coupled to the example automation request interface 210.

In operation, the example automation request interface 210 receives an automation request to provide a client/user with the centralized localization service 200. In some examples, the automation request interface 210 receives such an automation request as part of a provisioning service by which a user/client reserves one or more resources of the example SDDC 102 (see FIG. 1). In some examples, the automation request is submitted to the automation request interface 210 of the illustrated example of FIG. 2 by users (e.g., system administrators). In some examples, the automation request interface 210 is implemented as a user interface of the computer device 148 and presented via a web page to the user. In some examples, such requests may be submitted via a programmatic interface such as, for example, an application programming interface (API), a representational state transfer (REST) interface, etc.

Upon receiving the automation request, the example provisioning controller 220 inspects the request and responds by registering geographical localization information of the user/client with the example localization controller 240. After registering with the example localization controller 240, responses to user requests received from the example provisioning user interface controller 250 are formatted in a language appropriate to the geographical localization information registered with the localization controller 240. In some examples, the ability to format the response in an appropriate language is based on information contained in a custom header included with the individual user requests. The information contained in the custom header is processed by the example provisioning controller 220 in collaboration with the localization controller 240. In some examples, when a custom header is absent from a request, the provisioning controller 220 consults the example identity service controller 230 for localization information. In some such examples, the identity service controller 230 communicates with the provisioning user interface controller 250 of the automation manager 130 to obtain the localization information needed to formulate a response in an appropriate language.

Figure 3:
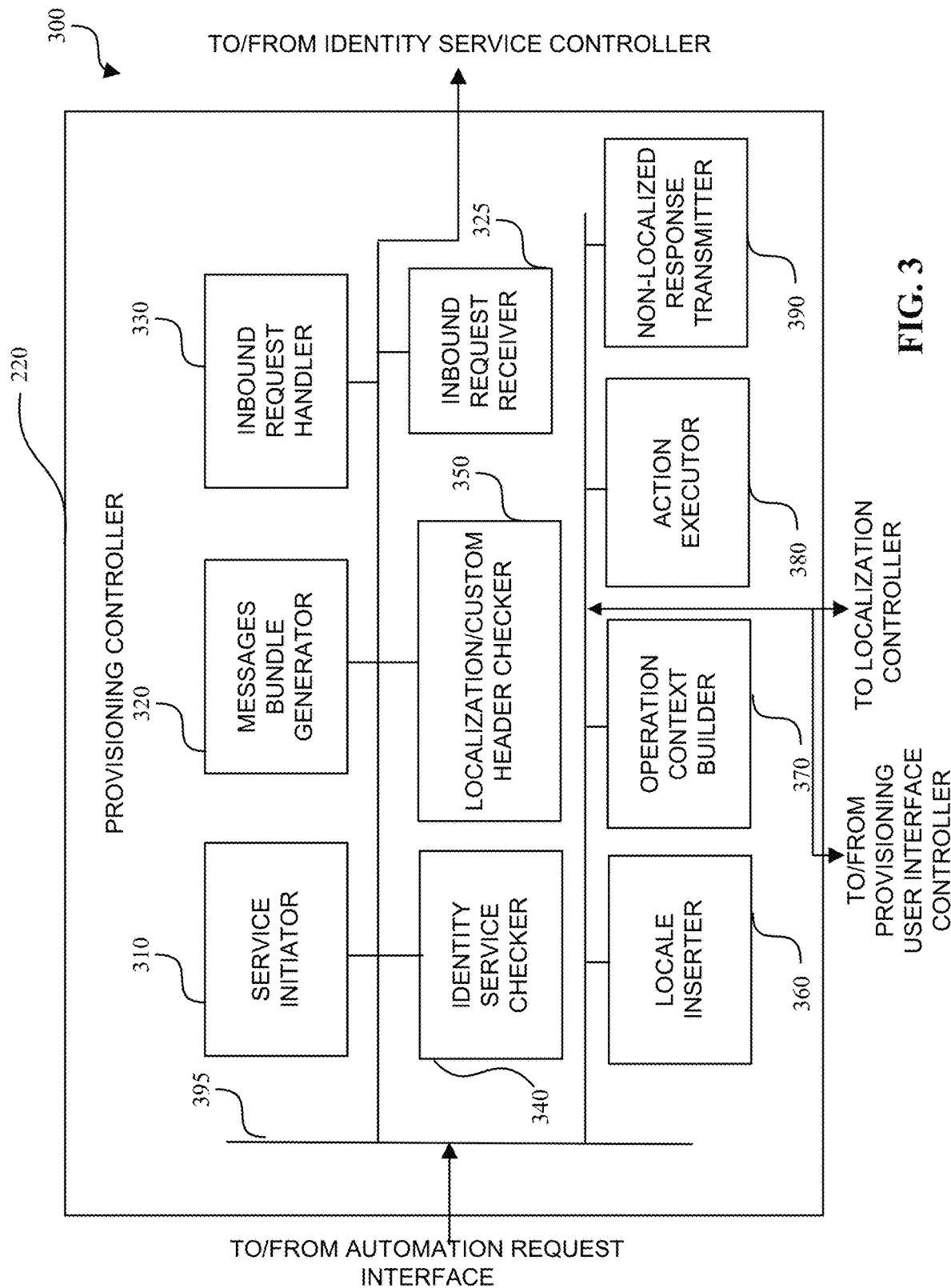
FIG. 3 is a block diagram of the example provisioning controller of FIG. 2.

FIG. 3 is a block diagram of an example implementation 300 of the provisioning controller 220 of FIG. 1 and FIG. 2. In some examples, the provisioning controller 220 includes an example service initiator 310, an example messages bundle generator 320, an example inbound request receiver 325, an example inbound request handler 330, an example identity service checker 340, an example localization/custom header checker 350, an example locale inserter 360, an example operation context builder 370, and example action executor 380, and an example non-localized response transmitter 390. In some examples, the above-identified example components of the example provisioning controller 220 communicate via bus 395 and the bus 395 receives communications from the example automation request interface 210 of FIG. 2.

Figure 5:
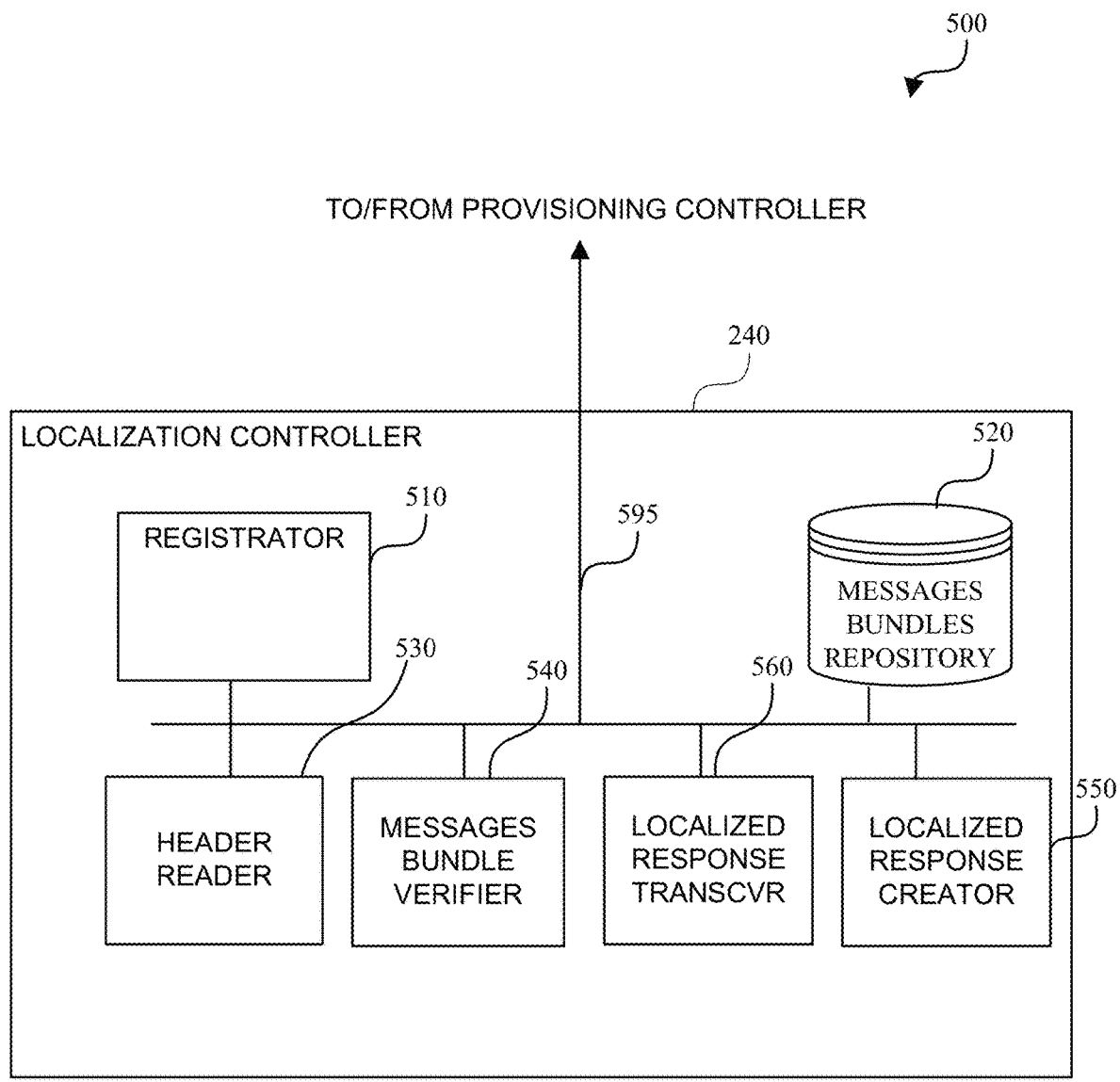
FIG. 5 is a block diagram of the example localization controller of FIG. 2.

In some examples, the example service initiator 310 of the example provisioning controller 220 receives a request from the automation request interface 210 (see FIG. 2) to provision one or more computer device(s) 148 of one or more users with the multi-service centralized localization service. In response to the request, the example service initiator 310 of the example provisioning controller 220 initiates a process by which the provisioning controller 220 registers the computer device(s) 148 to be provisioned with the localization service. In some such examples, the registration is caused by the messages bundle generator 320 which generates messages bundles for a user of a computer device (e.g., the computer device 148) to be registered. Information contained in the messages bundles are stored in an example messages bundles repository 520 (FIG. 5) of the localization controller 240 (FIG. 2 and FIG. 5). The information contained in the messages bundles is described in detail in connection with FIG. 5. In some examples, the messages bundle(s) are provided by the provisioning controller 220 to the localization controller 240 for use in identifying an appropriate language and format to be used for responses to user requests received from one or more of the computer devices 148 as described further below.

In some examples, after the multi-service centralized localization provisioning has been initiated and the messages bundles have been generated, the multi-service centralized localization system 100 is ready to begin receiving user requests to be localized. In some examples, a user request submitted at the provisioning user interface controller 250 is received at the example inbound request receiver 325 of the provisioning controller 220 and is provided by the receiver to the inbound request handler 330 (also of the provisioning controller 220). Upon receiving the user request, the inbound request handler 330 causes the example localization/custom header checker 350 to determine whether the inbound request includes a custom header. In some examples, the custom header is inserted by the example provisioning user interface controller 250. When the localization/custom header checker 350 determines that the inbound request does not include a custom header, then the identity service checker 340 checks to determine whether an identity service is available. In some examples, the localization/custom header checker 350, upon determining a custom header is not included in the request, generates an error message that is supplied to the identity service checker 340. In some examples, when the identity service checker determines, in response to the error message that an identity service exists, the example identity service controller 230 is consulted to identify a locale identifier of the user as described further below. The identity service controller 230 (see FIG. 2) supplies the locale identifier to the example locale inserter 360 which operates to insert the locale identifier into a header of the request.

Figure 6:
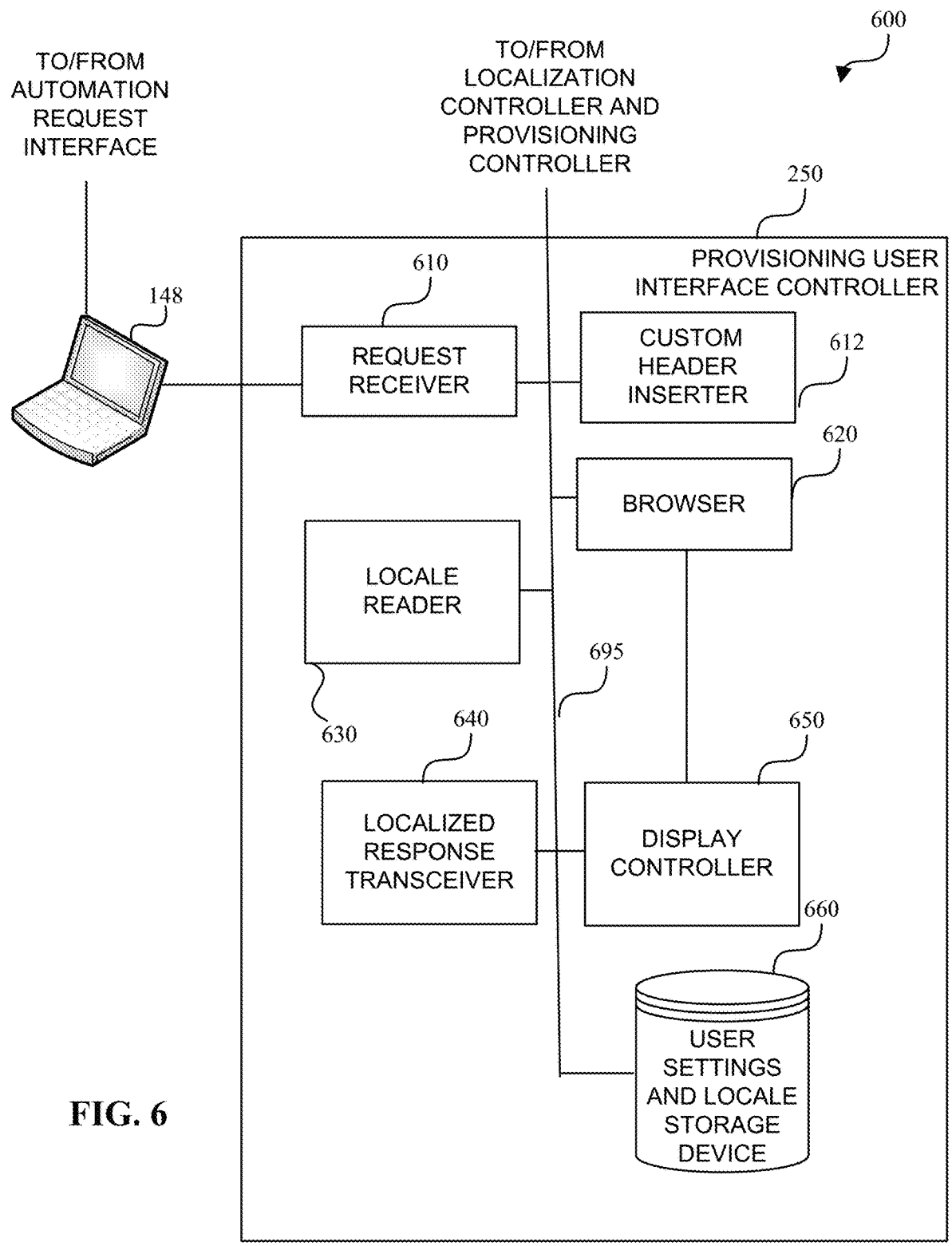
FIG. 6 is a block diagram of the example provisioning user interface controller.

In some examples, when the identity service checker 340 determines that an identity service is not available, a request for locale information transmitted by the identity service checker 340 (FIG. 3) is received at an example locale reader 630 (FIG. 6). The locale reader 630 reads the locale identifier from an example browser 620 (FIG. 6) and provides the locale identifier to the example operation context builder 370 of the provisioning controller 220 for use in generating the first response (also referred to as a non-localized response). In some such examples, the information provided by the browser 620 is a default setting. For example, the default setting of the browser 620 is chosen based on the IP address of the browser 620. In contrast, via the identity service controller 230, the user is able to select a preferred language so that when opening, for example, the provisioning service user interface on any browser in any global location, the user's preferred language will be used to present the provisioning service user interface.

In some examples, after the example locale inserter 360 has inserted the locale identifier into the header or when the localization/custom header checker 350 determines that the inbound request does include a custom header, the example operation context builder 370 uses the supplied locale information from the identity service checker 340 or from the custom header to build an operation context for the request. In some examples, building the operation context includes caching the locale identifier associated with a user-request for use in all subsequent, similar requests. In some examples, operation context refers to context related to a current request. The context can include request information (e.g., a resource being requested) authorization related information to indicate whether the request is authorized, is internal to the provisioning service, a language in which to provide a response to the request, etc. In some examples, the cache is used to store the context so that the context information is available for future requests by the same user.

In some examples, the example action executor 380 then executes the action included in the submitted request to thereby generate a non-localized response. When the example action executor 380 is able to successfully perform the action requested by the user, the action executor 380 generates the non-localized response to the requested action indicating the action was successful. In some examples, the non-localized response generated by the action executor 380 includes a success code indicating the action was successfully executed. When the action executor 380 is unable to successfully perform the action requested by the user, the action executor 380 generates non-localized response that includes an error code indicating the requested action was unsuccessful. The action executor 380 can supply the non-localized response with the corresponding locale (e.g., locale identifier) to the example non-localized response transmitter 390 which transmits the non-localized response to the example localization controller 240. The localization controller 240 operates to generate a localized response based on the non-localized response. The localized response is formatted in a manner that is appropriate to the locale identifier included in the header of the non-localized response, and the localized response is formatted to include a message corresponding to the error code for the micro-service to which the user request was directed, as further described below.

Figure 4:
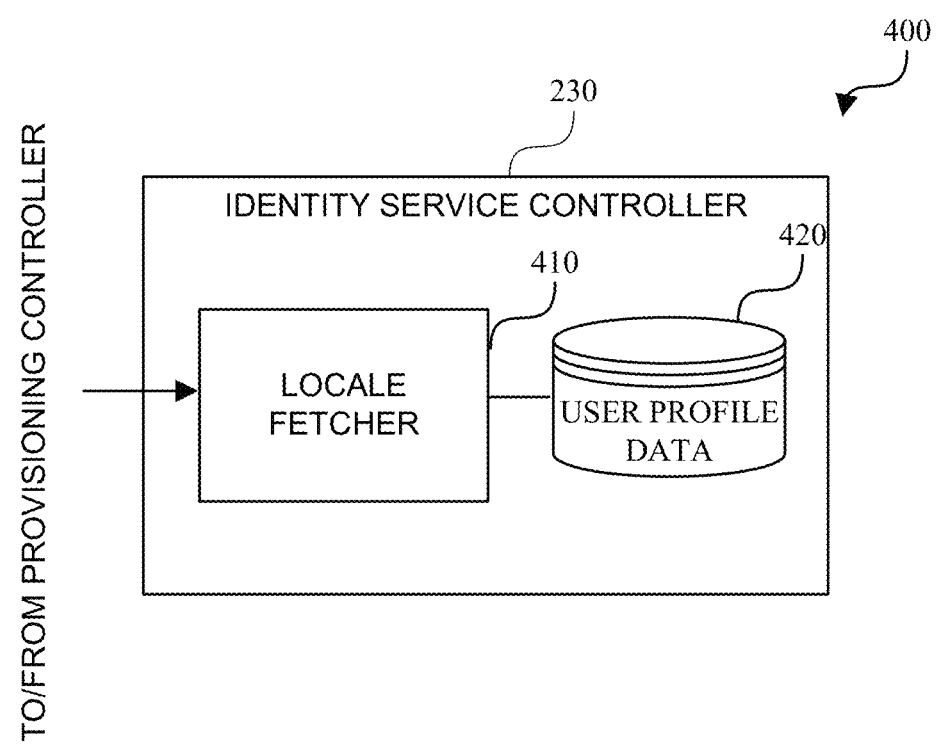
FIG. 4 is a block diagram of the example identity service controller of FIG. 2.

FIG. 4 is a block diagram of an example implementation 400 of the example identity service controller 230 of FIG. 2. In some examples, the identity service controller 230 (FIG. 2) includes an example locale fetcher 410 (FIG. 5) and an example user profile database 420. In some examples, the user profile database 420 stores a set of user profiles. In some examples, the user profiles include an identity of a user and locale information corresponding to the user. In some examples, the user profile data storage 420 is populated by the users of the centralized localization service via a user interface that can be managed by the identity service controller 230. In some such examples, the user selects a locale (included in a localization setting) in the user profile data storage 420 when electing to receive the centralized localization service. In some examples, the user selects a language and a regional format. For example, the user may select the English language and may select the United States as a region. As such, future responses to requests will be formatted using the version of English used in the United States.

In some examples, as described above, the identity service checker 340 (FIG. 3) of the provisioning controller 220 determines whether an identity service (e.g., the identity service controller 230) is available. When such an identity service controller 230 is available, the identity service checker 340 (see FIG. 3) of the provisioning controller 220 (see FIG. 2 and FIG. 3), notifies the example locale fetcher 410 of the identity service controller 230. The locale fetcher 410 then uses information provided by the identity service checker 340 to access user profile information in the user profile data storage 420. The user profile information includes a locale identifier which the locale fetcher 410 obtains from the user profile data storage 420. The locale information (also referred to as a locale identifier) corresponding to the user is supplied to the provisioning controller 220 for use by the locale inserter 360 (FIG. 3) as described above. When such an identity service controller 230 is not available, a request for locale information is transmitted from the identity service checker 340 (FIG. 3) of the example provisioning controller 220 and is received at the locale reader 630 (FIG. 6). The locale reader 630 reads a default locale from the browser 620 and provides the locale information to the provisioning controller 220 for use in generating the non-localized response, as described above with respect to FIG. 3. In some such examples, the information provided by the browser 620 is a default setting used when user profile information is not available.

FIG. 5 is a block diagram of an example implementation 500 of the example localization controller 240 of FIG. 2. In some examples, the localization controller 240 includes an example registrator 510, an example messages bundle repository 520, an example header reader 530, an example messages bundle verifier 540, and an example localized response creator 550. In some examples, localization controller 240 operates to create a second response (also referred to as a localized response) based on a first response (also referred to as a non-localized response) generated by the action executor 380 (FIG. 3) of the example provisioning controller 220 (FIG. 2 and FIG. 3). The localized response is formatted in a manner that is appropriate to a locale identifier provided with the non-localized response. In some examples, the formatting includes generating the localized response in a language associated with the locale identifier. In some examples, the localization controller 240 also operates to provide for the registration of users of computer devices (e.g., the computer device 148 (see FIG. 2)) so that such users can use the multi-service centralized localization service. In some examples, the above-identified example components of the example localization controller 240 communicate via bus 595, and the bus 595 receives communications from the example provisioning controller 220.

In some examples, when the example provisioning controller 220 initiates a registration service, the service initiator 310 (FIG. 3) of the provisioning controller 220 notifies the example registrator 510 of FIG. 5. The service initiator 310 of the provisioning controller 220 can initiate the service in response to any user request (or administrator request) to register the user for any of multiple micro-services that collaborate to provide a service (also referred to as a macro-service) via the software-defined data center 102 of FIG. 1. In some examples, the centralized localization service supports all micro-services such that any user request for an action to be taken by any micro-service is submitted to the centralized localization service provided by the automation manager 130 (FIG. 1 and FIG. 2). In this way, regardless of the micro-service being used, a response to a user request associated with any micro-service will be presented in a manner and a format that is based on a locale identifier associated with the user.

In response to an indication from the example service initiator 310 (FIG. 3), the example registrator 510 creates messages bundles for storage in the example messages bundles repository 520. In some examples, a messages bundle is created for each micro-service to receive the centralized localization service offered by the automation manager 130 (FIG. 1 and FIG. 2). In some examples, every micro-service is associated with the centralized localization service such that user requests submitted to any micro-service are processed (at least initially) by the centralized localization service.

In some examples, the messages bundle created for any one of the micro-services includes responses to error codes or success codes generated (by the example action executor 380 (FIG. 3)). Further, the responsive messages (which indicate whether a requested user action failed or succeeded, respectively), can further include additional information about the failure or success of the user-requested action. In some such examples, at least some of the micro-services can have at least some error/success codes and corresponding additional information that is unique to different ones of the micro-services. For example, an error code responsive to an attempt to log in to a security micro-service, may indicate the log-in attempt failed and further instruct the user to re-enter a password or username. In a further example, an error code responsive to an attempt to modify a billing record of a billing micro-service may indicate that the request to modify failed and provide a reason why the request failed (e.g., the billing record is not modifiable, the billing record no longer exists, the user does not have authorization to modify the billing record, etc.).

In some examples, the codes (error and success) and corresponding responsive messages are stored multiple times in a messages bundle associated with a micro-service. In some such examples, a set of the codes and corresponding responsive messages are created (and stored) for each locale identifier and the set of corresponding responsive messages associated with each locale identifier are formatted in accordance with the identified locale. In some examples, a micro-service can support five different locales, each corresponding to a different language/geographical region. In such examples, five sets of the codes and corresponding responsive messages are stored, each set corresponding to one of the five different locales. In some such examples, when a code is generated in response to an attempt to perform an action with a microservice, the code and a corresponding locale identifier (associated with the user attempting to perform the action) is used to access the messages bundle corresponding to the micro-service. The locale identifier is used to locate a corresponding one of the five sets of codes and corresponding messages within the messages bundle of the micro-service. Next, the code (error or success) is located in the set of codes of the locale identifier and the message corresponding to code is used to respond to the user's attempt to perform the action. Further, as described above, the corresponding message, having been selected based on the code and the locale identifier of the micro-service, is formatted appropriately to the language/region associated with the user. (As described above, the user's attempt to perform the action is submitted by the user at the provisioning user interface controller 250 via an input device (e.g., a keyboard of the computer device 148)).

In some examples, when the non-localized response to a user request is generated by the provisioning controller 220 as described above, the non-localized response is transmitted by the non-localized response transmitter 390 of FIG. 3 to the example header reader 530 of the localization controller 240. The header reader 530 reads a header of the non-localized response. The header of the non-localized response can include for example, a locale identifier associated with the user to whom the corresponding localized response is to be later transmitted. In addition, the example messages bundle verifier 540 uses the locale identifier included in the response header to obtain messages bundle information from the messages bundle repository 520 in the manner described above. Thereafter, the example localized response creator 550 creates the localized response based on the non-localized response and the message information extracted from the messages bundle repository. In some examples, the localized response is then transmitted by the localized response transceiver 560 of the example localization controller 240 to the example provisioning user interface controller 250 for display at the computer device 148.

FIG. 6 is a block diagram of an example implementation 600 of the example provisioning user interface controller 250 of FIG. 2. In some examples, the provisioning user interface controller 250 includes an example request receiver 610, an example custom header inserter 612 coupled to the example computer device 148, an example browser 620, an example locale reader 630, an example localized response transceiver 640, an example display controller 650, and an example user settings and locale storage device 660. In some examples, the above-identified example components of the example provisioning user interface controller 250 communicate via bus 695, and the bus 695 receives communications from the localization controller 240 (FIG. 2) and the provisioning controller 220 (FIG. 2). In some examples, the user can initiate a request for access to the multi-service centralized localization service via the computer device 148. The request for access to the service is transmitted by the computer device 148 to the example automation request interface 210 (FIG. 2) of the automation manager 130 (FIG. 2). The automation request interface 210 responds in the manner described above (with respect to FIG. 3) to cause the service initiator 310 of the provisioning controller 220 to begin a registration process to register the computer device 148 with the service.

In some examples, the example request receiver 610 receives a user-generated request from the example computer device 148. The request may include a request for any type of service or any request that requires interfacing with, for example, the provisioning controller 220. Example services and/or requests can include a request for details about a compute resource, a subnet, a storage, etc., a request to start or stop a compute resource, a request to delete a compute resource, a request to perform a resource operation, etc. In some examples, the example custom header inserter 612 inserts a custom header into the request and then causes the request to be transmitted to the inbound request receiver 325 of the provisioning controller 220 (FIG. 1 and FIG. 2). In some such examples, information to be included in the custom header can be obtained from the example user settings and locale storage device 660. In some examples, the information to be included in the custom header is formatted in same manner as a standard "Accept-Language" field of an HTTP header. The provisioning controller 220 responds to the request in the manner described above with respect to FIG. 3.

In some examples, a localized response/message is received in response to the user request at the example localized response transceiver 640 of the provisioning user interface controller 250. The localized response/message is provided to the example display controller 650 which causes the display controller 650 to be presented on a display of the computer device 148 via the example browser 620. As described above with respect to FIGS. 2, 3, and 5, the localized response/message is presented in a language and format that is based on the locale of the computer device 148 due to the operations performed at the provisioning controller 220 and at the localization controller 240 (FIGS. 2, 3, and 5).

In some examples, the request receiver and custom header inserter 612 does not insert a custom header into the user request before providing the request to the provisioning controller 220. Instances in which a customer header is not inserted can include, for example, when the example request receiver 610 determines that a response is not necessary for the current request. In some such examples, in response to the user request, a request for locale information transmitted from the provisioning controller 220 is received at the locale reader 630. The locale reader 630 reads the locale from the browser 620 and provides the locale information to the provisioning controller 220 for use in generating the non-localized response, as described above with respect to FIG. 3. Thereafter, the localized response/message generated by the localization controller 240 is received at the localized response transceiver 640 for display at the browser 620, as described above.

In some examples, any or all of the example provisioning controller 220, the example automation request interface 210, the example identity service controller 230, the example localization controller 240 and/or the example provisioning user interface controller 250 of the illustrated example of FIG. 2 are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. However, in some examples as illustrated in FIG. 1, any or all of the example provisioning controller 220, the example automation request interface 210, the example identity service controller 230, the example localization controller 240 and/or the example provisioning user interface controller 250 of the illustrated example of FIG. 2 are implemented as a service of the automation manager.

While an example manner of implementing the automation manager 130 of FIG. 1 and FIG. 2 is illustrated in FIGS. 3, 4, 5, and 6, one or more of the elements, processes and/or devices illustrated in FIGS. 2, 3, 4, 5, and/or 6 may be combined, divided, re-arranged, omitted, eliminated and/or implemented in any other way. Further, the automation request interface 210, the example provisioning controller 220, the example identity service controller 230, the example localization controller 240, the example provisioning user interface controller 250, the example service initiator 310, the example message bundle generator 320, the example inbound request receiver 325, the example inbound request handler 330, the example identity service checker 340, the example localization/custom header checker 350, the example locale inserter 360, the example operation context builder 370, the example action executor 380, the example non-localized response transmitter 390, the example locale fetcher 410, the example user profile data storage 420, the example registrator 510, the example messages bundle repository 520, the example header reader 530, the example messages bundle verifier 540, the example localized response transceiver 560, the example localized response creator 550, the example request receiver and custom header inserter 610, the example browser 620, the example locale reader 630, the example localized response transceiver 640, the example display controller 650, the example user settings and locale storage device 660 and/or, more generally, the example automation manager 130 of FIG. 1 and FIG. 2 3 may be implemented by hardware, software, firmware and/or any combination of hardware, software and/or firmware. Thus, for example, any of the example the automation request interface 210, the example provisioning controller 220, the example identity service controller 230, the example localization controller 240, the example provisioning user interface controller 250, the example service initiator 310, the example message bundle generator 320, the example inbound request receiver 325, the example inbound request handler 330, the example identity service checker 340, the example localization/custom header checker 350, the example locale inserter 360, the example operation context builder 370, the example action executor 380, the example non-localized response transmitter 390, the example locale fetcher 410, the example user profile data storage 420, the example registrator 510, the example messages bundle repository 520, the example header reader 530, the example messages bundle verifier 540, the example localized response transceiver 560, the example localized message creator 550, the example request receiver and custom header inserter 610, the example browser 520, the example locale reader 630, the example localized response transceiver 640, the example display controller 650, the example user settings and locale storage device 660 and/or, more generally, the example automation manager 130 of FIG. 1 and FIG. 2 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the automation request interface 210, the example provisioning controller 220, the example identity service controller 230, the example localization controller 240, the example provisioning user interface controller 250, the example service initiator 310, the example message bundle generator 320, the example inbound request receiver 325, the example inbound request handler 330, the example identity service checker 340, the example localization/custom header checker 350, the example locale inserter 360, the example operation context builder 370, the example action executor 380, the example non-localized response transmitter 390, the example locale fetcher 410, the example user profile data storage 420, the example registrator 510, the example messages bundle repository 520, the example header reader 530, the example messages bundle verifier 540, the example localized response transceiver 560, the example localized message creator 550, the example request receiver and custom header inserter 610, the example browser 520, the example locale reader 630, the example localized response transceiver 640, the example display controller 650, and/or the example user settings and locale storage device 660 is/are hereby expressly defined to include a non-transitory computer readable storage device or storage disk such as a memory, a digital versatile disk (DVD), a compact disk (CD), a Blu-ray disk, etc. including the software and/or firmware. Further still, the example automation manager 130 of FIG. 1 and FIG. 2 may include one or more elements, processes and/or devices in addition to, or instead of, those illustrated in FIGS. 2, 3, 4, 5, and 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
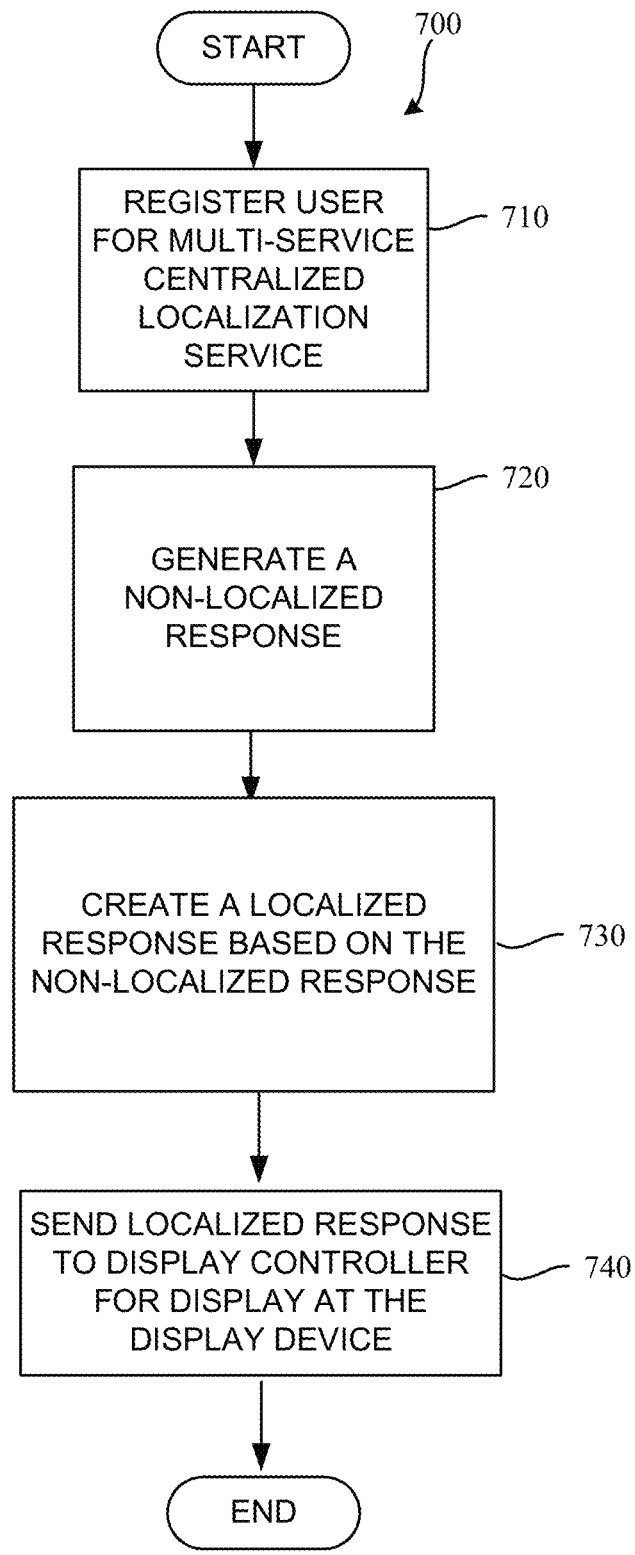
FIG. 7 is a flowchart representative of example machine-readable instructions that may be executed to implement the example automation manager of FIG. 1 and/or FIG. 2 to localize a response to a user request.

A flowchart representative of example hardware logic, machine readable instructions, hardware implemented state machines, and/or any combination thereof for implementing at least a portion of the example provisioning controller 220 of FIGS. 2 and 3 and the example localization controller 240 of FIGS. 2, and 4 is shown in FIG. 7. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 7, many other methods of implementing the provisioning controller 220 and the localization controller 240 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 8:
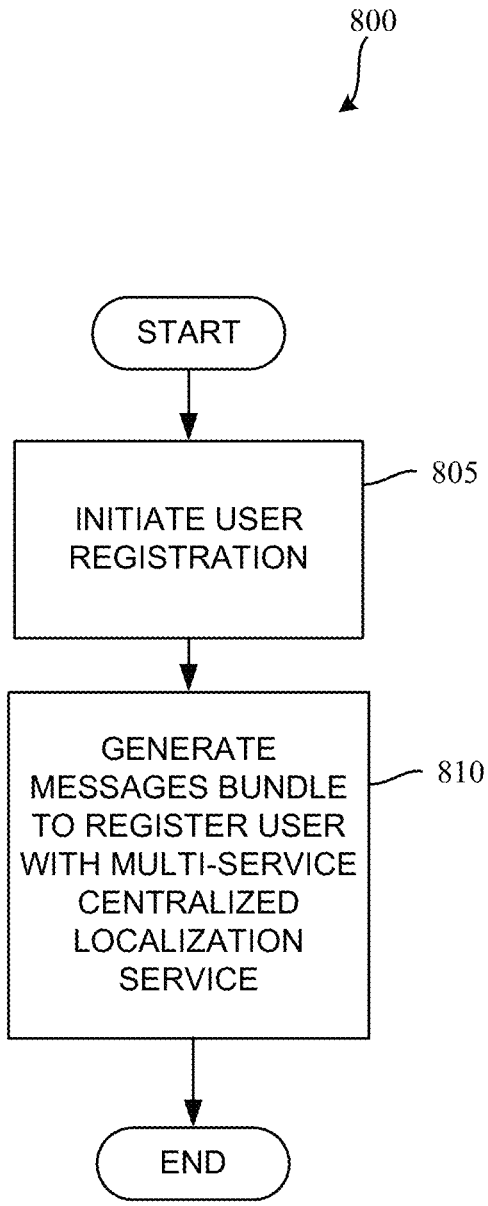
FIG. 8 is a flowchart representative of example machine readable instructions that may be executed to implement the example provisioning controller and the example identity service controller of FIG. 2 to register a user with a centralized localization service.

A flowchart representative of example hardware logic, machine readable instructions, hardware implemented state machines, and/or any combination thereof for implementing at least a portion of the example provisioning controller 220 of FIGS. 2 and 3, and at least a portion of the example localization controller 240 FIGS. 2 and/or 4 is shown in FIG. 8. The machine readable instructions may be one or more executable programs or portion(s) of an executable program for execution by a computer processor and/or processor circuitry, such as the processor 1012 shown in the example processor platform 1000 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example provisioning controller 220 and the example localization controller 240 and/or more generally the automation manager 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 9:
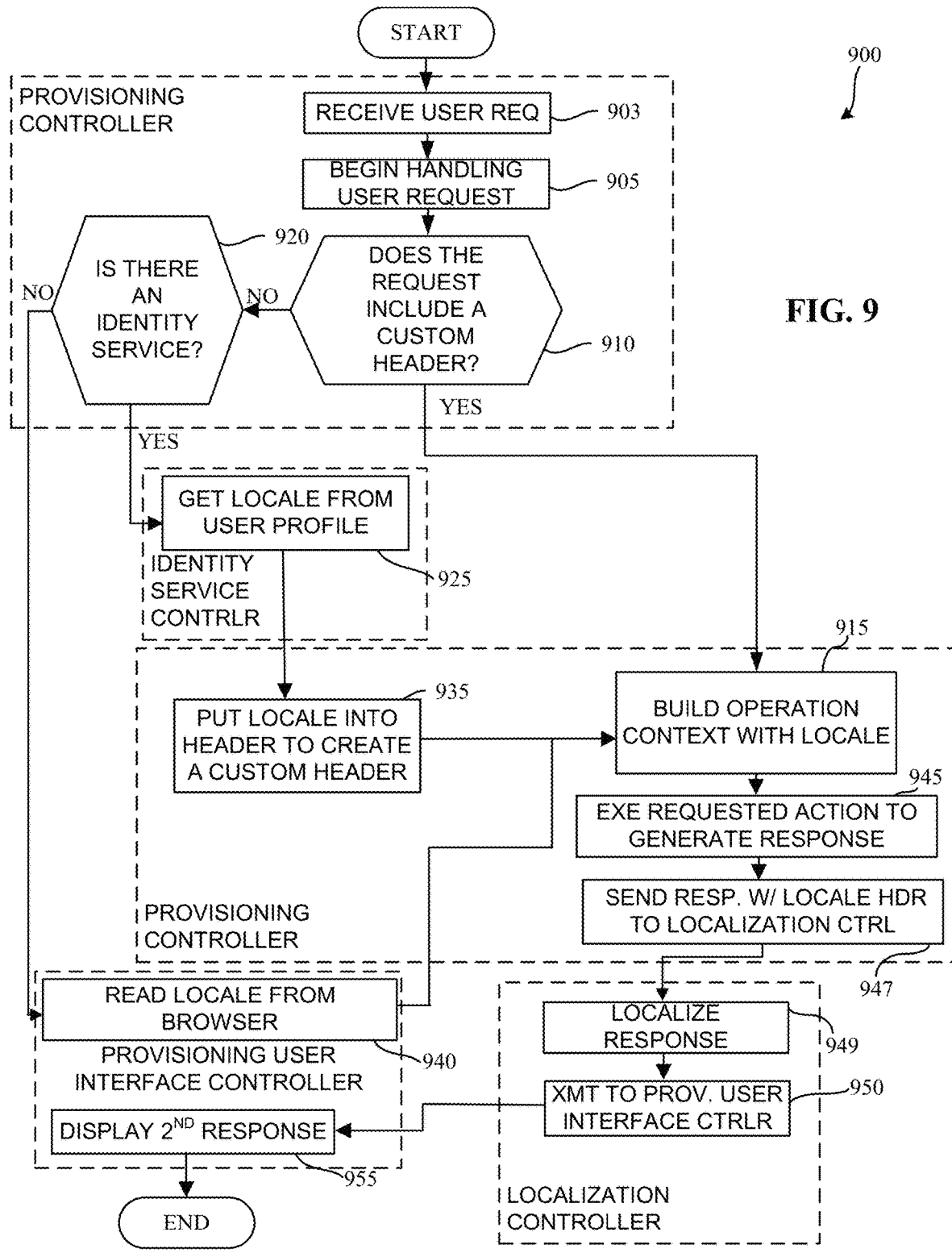
FIG. 9 is a flowchart representative of example machine readable instructions that may be executed to implement the example provisioning controller, the example identity service controller, the example localization controller 240 and the example provisioning user interface controller of FIG. 2 to localize a response to user request based on a custom header or an identity service.

A flowchart representative of example hardware logic, machine readable instructions, hardware implemented state machines, and/or any combination thereof for implementing at least a portion of the example provisioning controller 220, at least a portion of the example identity service controller 230, at least a portion of the example localization controller 240, and at least a portion of the example provisioning user interface controller 250 of FIGS. 2, 3, 4, 5, and 6 is shown in FIG. 9. The machine readable instructions may be one or more executable programs or portion(s) of an executable program for execution by a computer processor and/or processor circuitry, such as the processors 1012 and 1112 shown in the example processor platforms 1000 and 1100 discussed below in connection with FIG. 10 and FIG. 11. The program may be embodied in software stored on a non-transitory computer readable storage medium such as a CD-ROM, a floppy disk, a hard drive, a DVD, a Blu-ray disk, or a memory associated with the processors 1012 and/or 1112, but the entire program and/or parts thereof could alternatively be executed by a device other than the processors 1012 and/or 1112 embodied in firmware or dedicated hardware. Further, although the example program is described with reference to the flowchart illustrated in FIG. 9, many other methods of implementing the example automation manager 130 and the components thereof may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7, 8 and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine-readable instructions that may be executed to implement at least a portion of the provisioning controller 220 of FIGS. 2 and/or 3 and at least a portion of the localization controller 240 of FIGS. 2 and 5. The example process 700 of the illustrated example of FIG. 7 registers a user to receive the multi-service centralized localization service and then uses the multi-service centralized localization service to processes user requests. In some examples, the example service initiator 310 of the example provisioning controller 220 begins a registration process by causing the example messages bundle generator 320 to generate a messages bundle(s) containing information that will allow the user to receive the multi-service centralized localization service (Block 710). As described above with respect to FIG. 5, in some examples, the example registrator 510 of the example localization controller 240 uses the messages bundle(s) (also Block 710) to complete the registration process. Example instructions that may be used to implement block 710 are described below in connection with FIG. 8.

One or more of the example components of the provisioning controller 220 including the example inbound request receiver 325, the example inbound request handler 330, the example identity service checker 340, the example localization/custom header checker 350, the example locale inserter 360, the example operation context builder 370, the example action executor 380 and/or the example non-localized response transmitter 390 handle requests from users to generate a non-localized response to the user request and to send the non-localized response to the localization controller 240 (Block 720).

The example localization controller 240 causes the non-localized response to be localized (Block 730). In some examples the example header reader 530, the example messages bundle verifier 540, and/or the example localized response creator 550 generate the localized response based on the non-localized response (Block 730). The example localized response transceiver 560 transmits the localized response to the example display controller 650 of the example provisioning user interface controller 250 for display at the user device 148 (Block 740). The example process 700 of the illustrated example of FIG. 7 then terminates but may be repeated in response to receipt of subsequent user requests.

FIG. 8 is a flowchart representative of example machine readable instructions that may be executed to implement at least a portion of the example provisioning controller 220 and at least a portion of the example localization controller 240 of FIGS. 2, 3 and/or 5. The example instructions of FIG. 8 may be used to implement block 710 of FIG. 2. The example process 800 of FIG. 8 begins when a user is to be registered to receive the multi-service centralized localization service, and the example service initiator 310 of the example provisioning controller 220 initiates a registration process. The example service initiator 310 initiates user registration (Block 805). For example, the example service initiator 310 initiates user registration (Block 805). For example, the example service initiator 310 causes the example messages bundle generator 320 to generate a messages bundle containing information relevant to the user. The example registrator 510 registers the user with multi-service centralized localization service (Block 810). For example, the registrator 510 of the example localization controller 240 uses the messages bundle to register the user so that future requests from the user are processed using the multi-service centralized localization service. The example process 800 of the illustrated example of FIG. 8 then terminates but may be repeated as needed to register additional users.

FIG. 9 is a flowchart representative of example machine readable instructions that may be executed to implement at least a portion of the example provisioning controller 220, at least a portion of the example identity service controller 230, at least a portion of the example localization controller 240, and at least a portion of the example provisioning user interface controller 250 of FIGS. 2, 3, 4, 5, and/or 6. To lend clarity, blocks of the instructions of FIG. 9 are included within boxes indicated with dashed lines. Each box also includes a name of a component that performs the flowchart blocks within the box. The example process 900 of FIG. 9 begins when a user request (submitted at the computer device 148) is received at the example inbound request receiver 325 of the example provisioning controller 220 (Block 903) and is provided to the example inbound request handler 330. The example inbound request handler (also of the provisioning controller 220) begins handling the user request (Block 905). In some examples, the provisioning controller can begin handling the user request by parsing fields included in the request, storing the user request in a storage/buffer, etc. The example localization/custom header checker 350 reviews the request to determine whether a localization/custom header is present in the request (Block 910). When the localization/custom header is present, the example operation context builder 370 of the provisioning controller 220 builds an operation context for the request in light of the locale information (Block 915). When the localization/custom header is not present, the example identity service checker 340 of the provisioning controller 220 checks to determine whether an identity service is available (Block 920). When the identity service is available, the identity service checker 340 accesses an example user profile data storage 420 via the example locale fetcher 410 (both of the identity service controller 230) to obtain user profile information that includes a user locale (Block 925). The locale inserter 360 of the provisioning controller 220 inserts the user locale into a header of the user request to create a custom header (Block 935). The user request with the custom header having the locale information is then supplied to the operation context builder 370 which operates in the manner described above (see description of Block 915). When (at Block 920) the identity service checker 340 determines that an identity service is not available, the identity service checker 340 accesses the example browser 620 of the example provisioning user interface controller 250 to obtain locale information (Block 940). In some examples, the provisioning user interface controller 250 also causes locale information to be inserted into the header of the user request (Block 940). In some examples, the locale information is supplied to the operation context builder 370 without first inserting the locale into the header of the user request.

The example operation context builder 370 supplies the user request to the action executor 380 which performs/ executes the user request to generate a first (non-localized) response and the example non-localized response transmitter 390 of the example provisioning controller 220 (Block 945) and sends the response to the example localized response creator 550 of the example localization controller 240 (Block 947). The localized response creator 550 generates a localized response based on the first (non-localized response) (Block 950). In some examples, the example header reader 530 aids in generating the localized response by reading the custom header of the non-localized response, and the messages bundle verifier 540 of the example localization controller 240 verifies that the user is registered for the service and collects any needed information available from the example messages bundle repository 520. The localized response is then transmitted by the example localized response transceiver 560 to the example localized response transceiver 640 of the example provisioning user interface controller 250 (also Block 950). The localized response transceiver 640 provides the localized response to the example display controller 650. The display controller 650 displays the second localized response at the example computer device 148 via the example browser 620 (Block 955). For example, the example process 900 of the illustrated example of FIG. 9 then terminates but may be repeated, for example, upon receipt of subsequent user requests.

Figure 10:
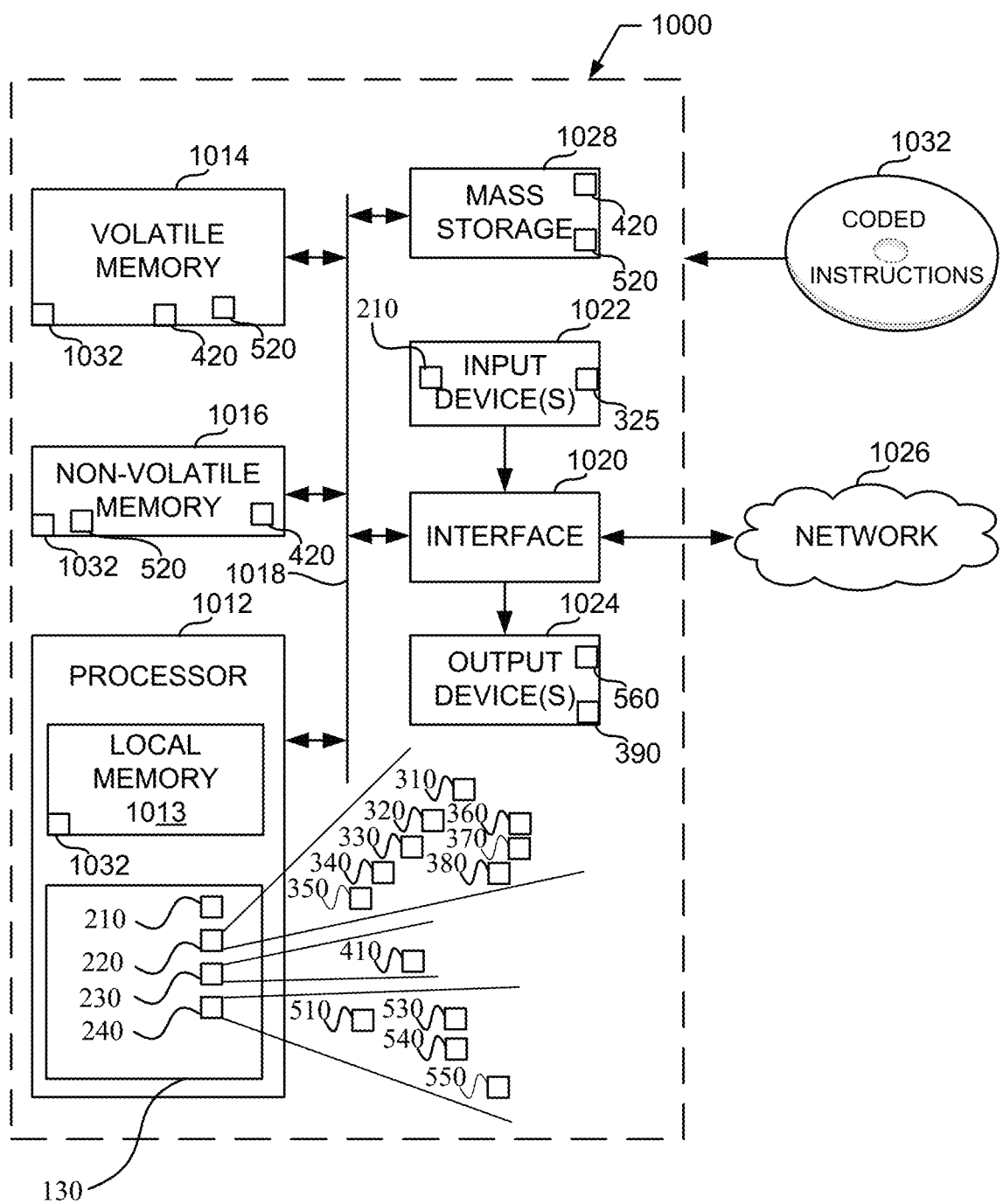
FIG. 10 is a block diagram of an example processor platform structured to execute the instructions of FIGS. 7 and 8 and to execute at least portions of the instructions of FIG. 9 to implement at least portions of the components of the automation manager depicted in the block diagrams of FIGS. 1, 2, 3, 4, and 5.

FIG. 10 is a block diagram of an example processor platform 700 structured to execute the instructions of FIG. 7, and FIG. 8, and to execute at least a portion of the instructions of FIG. 9 to implement the example components of the automation manager illustrated in FIG. 2. The processor platform 1000 can be, for example, a server, a personal computer, a workstation, a self-learning machine (e.g., a neural network), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example automation manager 130, the example automation request interface 210, the example provisioning controller 220, the example identity service controller 230, the example localization controller 240, the example service initiator 310, the example messages bundle generator 320, the example inbound request handler 330, the example identity service checker 340. The example localization/ custom header checker 350, the example locale inserter 360, the example operation context builder 370, the example action executor 380, the example locale fetcher 410, the example registrator 510, the example header reader 530, the example message bundle verifier 540, and/or the example localized response creator 550.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller. In this example, any of the example volatile memory 1014, the non-volatile memory 1016 and/or the mass storage 1028 can be used to implement the example user profile data storage 420 (FIG. 4) and/or the example messages bundle repository 520 (FIG. 5).

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device is used to implement the automation request interface 210.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc. In this example, the example interface circuit and/or the example output devices can be implemented using the example non-localized response transmitter 390 (FIG. 3), the example inbound request receiver 325, and/or the example localized response transceiver 560.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 7 may be stored in the mass storage device 1028, in the volatile memory 1014, in the non-volatile memory 1016, and/or on a removable non-transitory computer readable storage medium such as a CD or DVD.

Figure 11:
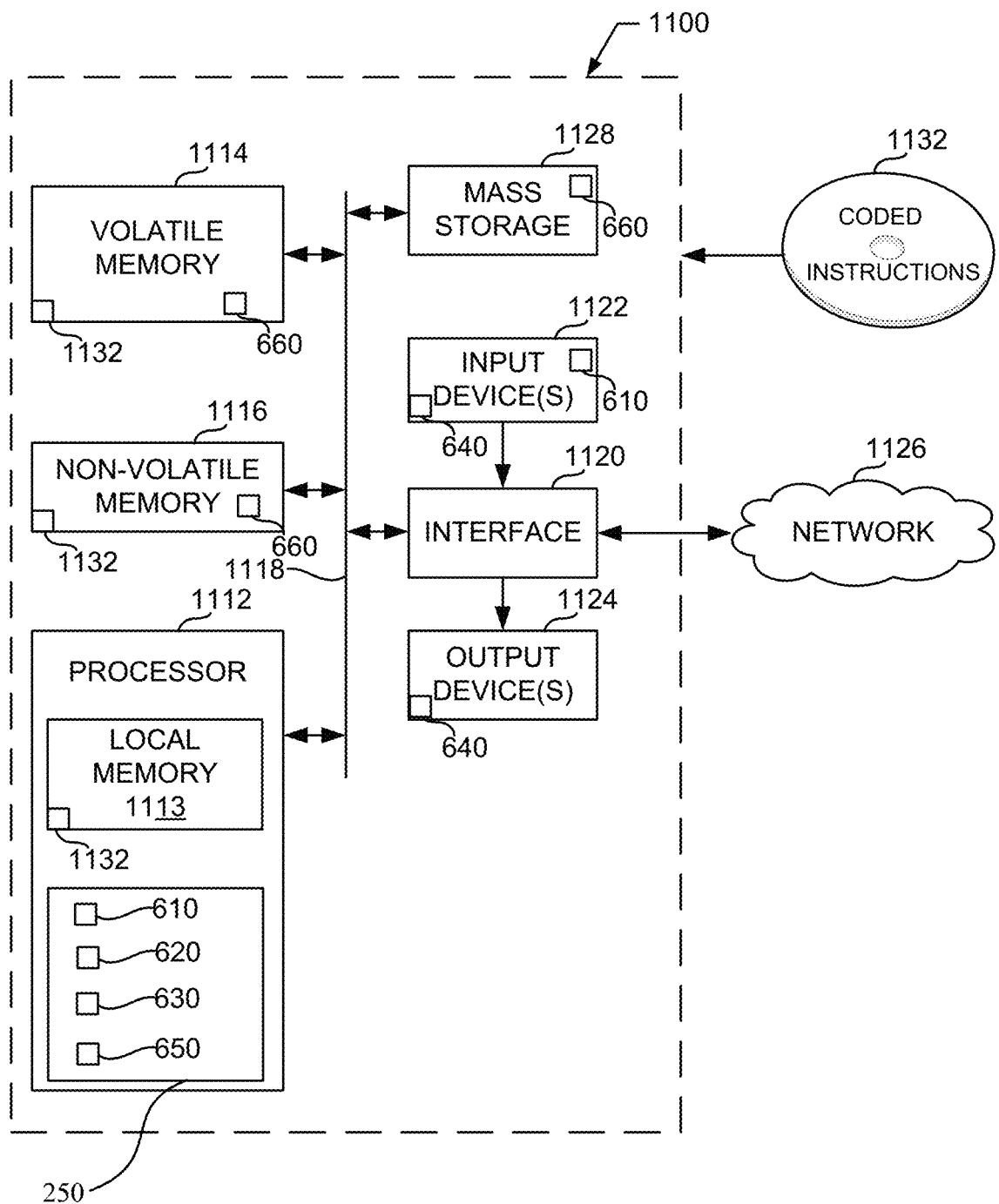
FIG. 11 is a block diagram of an example processor platform structured to execute at least a portion of the instructions of FIG. 9 to implement the provisioning user interface controller of FIG. 6.

FIG. 11 is a block diagram of an example processor platform 1100 structured to execute at least portions of the instructions of FIG. 9 to implement the provisioning user interface controller 250 of FIGS. 2 and/or 6. The processor platform 1100 can be, for example, a server, a personal computer, a workstation, a self-learning machine (e.g., a neural network) or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example locale reader 630, the example browser 620, the example display controller 650, and at least a portion of the example request receiver 610 and the example custom header inserter 612.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system. In this instance, the input devices 1122 and/or the interface circuit 1120 is/are implemented by the keyboard of the computer device 148, the request receiver 610, and the localized response transceiver 640.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip, and/or a graphics driver processor. In this instance, the example output device 1124 implements the display of the example computer device 148.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

At least a portion of the machine executable instructions 1132 of FIG. 9 may be stored in the mass storage device 1128, in the volatile memory 1114, in the non-volatile memory 1116, and/or on a removable non-transitory computer readable storage medium such as a CD or DVD. The example mass storage 1128 may implement the example user settings and locale storage device 660.

Figure 12:
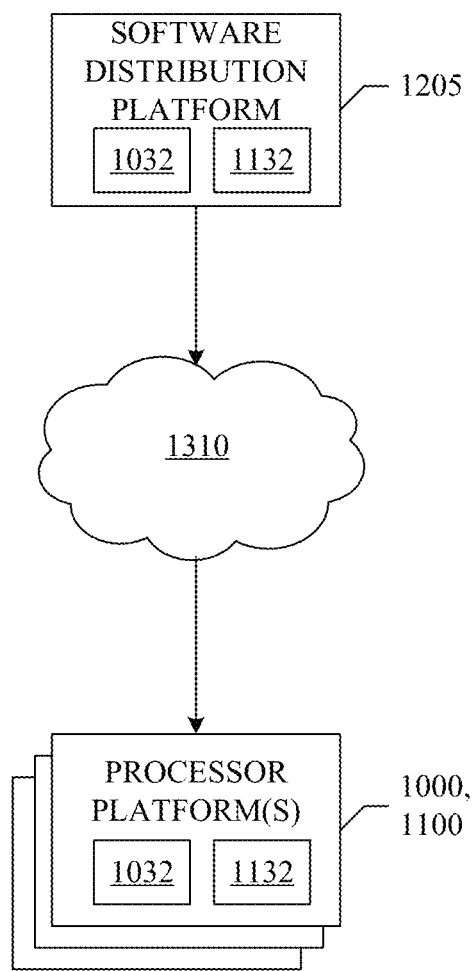
FIG. 12 is a block diagram of an example software distribution platform to distribute software (e.g., software corresponding to the example computer readable instructions of FIGS. 7, 8, and/or 9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1032 of FIG. 10 and/or the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10 and/or the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 1032, which may correspond to the example computer readable instructions 700, 800 and 900 of FIGS. 7, 8 and portions of FIG. 9, and/or store the computer readable instructions 1132, which may correspond to the example computer readable instructions 900 of FIG. 9, as described above.

The one or more servers of the example software distribution platform 1205 are in communication with a network 1210, which may correspond to any one or more of the Internet and/or any of the example networks 150 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032, 1132 from the software distribution platform 1205. For example, the software, which may correspond to the example computer readable instructions 700 of FIG. 7, the computer readable instructions 800 of FIG. 8 and at least a portion of the computer readable instructions 900 of FIG. 9 may be downloaded to the example processor platform 1000, which is to execute the computer readable instructions 1032 to implement the example automation manager 130 (and the components thereof) of FIGS. 1-5. Additionally or alternatively, the software which may correspond to at least a portion of the example computer readable instructions 900 of FIG. 9, may be downloaded to the example processor platform 1100, which is to execute the computer readable instructions 1132 to implement the example provisioning user interface controller 250 of the computer device 148 of FIGS. 1 and 6. In some example, one or more servers of the software distribution platform 1205 periodically offer, transmit, and/or force updates to the software (e.g., the example computer readable instructions 1032 of FIG. 10, the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that enable a micro-service centralized localization service to reduce the amount of processing required to provide localized information to computers operating in a cloud environment. The disclosed methods, apparatus and articles of manufacture improve communications between user computer devices and micro-services disposed in the cloud by automatically providing localized responses to user requests without requiring additional communication between the user computer devices and the micro-services to obtain locale information. The ability to provide centralized localization to users of micro-services greatly reduces the amount of communication traffic needed to localize information presented at the user computer devices. As disclosed herein, micro-services can refer to any of the numerous services that collaborate to provide a main service. Micro-services can be directed to, for example, identity checking, provisioning resources, billing activities, etc. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 is an apparatus to provide a centralized localization message service to a plurality of micro-services. The apparatus includes messages bundle generator to generate a plurality of messages bundles. Respective ones of the messages bundles are associated with respective ones of the plurality of micro-services. The apparatus also includes a localized response creator to create a localized response based on a non-localized response to a request by a user to one of the plurality of micro-services. The localized response is based on one of the plurality of messages bundles and the one of the plurality of messages bundles corresponds to the one of the plurality of micro-services.

Example 2 includes the apparatus of Example 1. In Example 2, the one of the plurality of messages bundles corresponding to the one of the plurality of micro-services includes sets of codes. Respective ones of the sets of codes correspond to respective locale identifiers.

Example 3 includes the apparatus of Example 1. In Example 3, respective sets of codes included in the one of the plurality of messages bundles correspond to respective locale identifiers. In Example 3, the locale identifiers identify at least one of a language or a geographical region associated with a preference of the user.

Example 4 includes the apparatus of Example 1 and further includes a header inserter to insert a header into the request by the user. The header includes a locale identifier, and the localized response creator creates the localized response based, at least in part, on the locale identifier.

Example 5 includes the apparatus of Example 1. In Example 5, at least some of the plurality of micro-services collaborate to perform a macro-service.

Example 6 includes the apparatus of Example 1. In Example 6, the localized response is further based on a locale identifier. In Example 6, the apparatus further includes a header checker. The header checker that determines whether the request by the user includes a custom header having a locale identifier. When request by the user does not include the custom header, the header checker obtains the locale identifier from a user profile.

Example 7 includes the apparatus of Example 6. The apparatus of Example 7 further includes an identity service controller that determines an identity of the user when the request by the user does not include the custom header.

Example 8 is at least one non-transitory computer readable storage medium including instructions that, when executed, cause at least one processor to at least generate a plurality of messages bundles, respective ones of the messages bundles associated with respective ones of a plurality of micro-services available in a distributed cloud environment. The instructions further cause the at least one processor to create a localized response based on a non-localized response to a request. The request is provided by a user to one of the plurality of micro-services and the localized response is based on one of the plurality of messages bundles. In addition, in Example 8, the one of the plurality of messages bundles corresponds to the one of the plurality of micro-services.

Example 9 includes the instructions of Example 8. In Example 9, the one of the plurality of messages bundles corresponding to the one of the plurality of micro-services includes sets of codes. In Example 9, respective ones of the sets of codes correspond to respective locale identifiers.

Example 10 includes the instructions of Example 8. In Example 10, respective sets of codes included in the one of the plurality of messages bundles correspond to respective locale identifiers. In addition, at least one of the locale identifiers identifies at least one of a language or a geographical region associated with a preference of the user.

Example 11 includes the instructions of Example 8. In Example 11, the instructions also cause the processor to insert a header into the request by the user, the header to include a locale identifier. In Example 11, the localized response is based, at least in part, on the locale identifier.

Example 12 includes the instructions of Example 8. In Example 12, at least some of the plurality of micro-services collaborate to perform a macro-service.

Example 13 includes the instructions of Example 8. In Example 13, the localized response is also based on a locale identifier. Additionally, in Example 13, the instructions, when executed, further cause the at least one processor to determine whether the request by the user includes a custom header having a locale identifier. In Example 13, when the request by the user does not include the custom header, the instructions cause the at least one processor to obtain the locale identifier from a user profile.

Example 14 includes the instructions of Example 13. In Example 14, the instructions further cause the at least one processor to determine an identity of the user when the request by the user does not include the custom header with the locale identifier.

Example 15 is a method to provide a centralized localization message service to a plurality of micro-services. The method includes generating, by executing an instruction with one or more processors, a plurality of messages bundles. Respective ones of the messages bundles are associated with respective ones of a plurality of micro-services available in a distributed cloud environment. The method of Example 15 also includes creating, by executing an instruction with the one or more processors, a localized response based on a non-localized response to a request. The request is provided by a user to one of the plurality of micro-services and the localized response is based on one of the plurality of messages bundles. In addition, the one of the plurality of messages bundles corresponds to the one of the plurality of micro-services.

Example 16 includes the method of Example 15. In Example 16, the one of the plurality of messages bundles corresponding to the one of the plurality of micro-services includes sets of codes. Respective ones of the sets of codes correspond to respective locale identifiers.

Example 17 includes the method of Example 15. In Example 17, the respective sets of codes included in the one of the plurality of messages bundles correspond to respective locale identifiers. In addition, at least one of the locale identifiers identifies at least one of a language or a geographical region associated with a preference of the user.

Example 18 includes the method of Example 15 and further includes determining whether a header of the request by the user includes a locale identifier. In Example 18, the localized response is based, at least in part, on the locale identifier.

Example 19 includes the method of Example 15. In Example 19, at least some of the plurality of micro-services collaborate to perform a macro-service.

Example 20 includes the method of Example 15. In the method of Example 20, the localized response is further based on a locale identifier and the method also includes determining whether the request by the user includes a custom header having a locale identifier. When the request by the user does not include the custom header, the method includes determining the locale identifier based on a user profile.

The following claims are hereby incorporated into this Detailed Description by this reference, with each claim standing on its own as a separate embodiment of the present disclosure.

What is claimed is:

1. A method comprising:
    registering, by executing an instruction with programmable circuitry, a user with a multi-service centralized localization service based on a locale identifier inserted into a header of a first request, the multi-service centralized localization service to process a subsequent request from the user without checking a profile of the user for the locale identifier corresponding to a plurality of locale identifiers;
    generating, by executing an instruction with the programmable circuitry, sets of messages bundles, respective sets of the messages bundles associated with respective ones of a plurality of micro-services available in a distributed cloud environment; and
    creating, by executing an instruction with the programmable circuitry, a localized response based on a code of a plurality of codes, respective ones of the codes corresponding to different possible outcomes of an attempt to provision a micro-service of the plurality of micro-services, respective ones of the plurality of locale identifiers representing respective different languages, the code and a corresponding one of the locale identifiers included in a non-localized response to a second request to provision the micro-service, the localized response to include a responsive message selected from messages bundles corresponding to the locale identifier, the messages bundles associated with the micro-service, the responsive message formatted in a language corresponding to the corresponding locale identifier, and the responsive message selected from the messages bundles based on the code.

2. The method of claim 1, wherein at least one of the locale identifiers is to identify a geographical region.

3. The method of claim 1, wherein the micro-service and at least a second micro-service collaborate to perform a macro-service.

4. The method of claim 1 further including:
    determining whether a third request includes a custom header; and when the third request does not include the custom header, determining a corresponding one of the locale identifiers based on a second user profile of a second user associated with the third request.

5. An apparatus comprising:

a registrator implemented by hardware or at least one processor, the registrator to register a user with a multi-service centralized localization service, the registering of the user based on a locale identifier inserted into a header of a first request to facilitate processing a subsequent request by the multi-service centralized localization service without checking a profile of the user for the locale identifier;

a messages bundle generator implemented by hardware or at least one processor, the messages bundle generator to generate messages bundles associated with a micro-service, respective ones of the messages bundles corresponding to different ones of a plurality of locale identifiers representing different languages, messages included in the different ones of the messages bundles formatted in different ones of the corresponding different languages, the messages included in the different ones of the messages bundles corresponding to respective codes representing respective different possible outcomes of an attempt to provision the micro-service; and a localized response creator implemented by hardware or at least one processor, the localized response creator to create a localized response based on a non-localized response to a second request to provision the micro-service, the non-localized response including at least one of the codes and at least one of the locale identifiers, the localized response based on the at least one of the codes from the messages bundles corresponding to the at least one of the locale identifiers.

6. The apparatus of claim 5, wherein the at least one of the locale identifiers identifies a geographical region.

7. The apparatus of claim 5, wherein the micro-service and at least a second micro-service collaborate to perform a macro-service.

8. The apparatus of claim 5, further including a header checker to:

determine whether a third request to provision the micro-service includes a custom header; and when the third request to provision the micro-service does not include the custom header, obtain a corresponding one of the locale identifiers based on a second user profile of a second user associated with the third request.

9. The apparatus of claim 8, further including an identity service controller, the identity service controller to determine an identity of the second user making the third request to provision the micro-service when the third request does not include the custom header.

10. An apparatus comprising:

interface circuitry;

registrator instructions to register a user with a multi-service centralized localization service based on a locale identifier inserted into a header of a first request, the multi-service centralized localization service to process a subsequent request from the user without checking a profile of the user for a presence of one or more locale identifiers of the plurality of locale identifiers;

message bundle generator instructions to generate sets of messages bundles, respective sets of the messages bundles associated with respective ones of a plurality of micro-services available in a distributed cloud environment;

localized response creator instructions to create a localized response based on a code of a plurality of codes corresponding to different possible outcomes of an attempt to provision a micro-service of the plurality of micro-services, respective ones of the plurality of locale identifiers representing respective different languages, the code and a corresponding one of the locale identifiers included in a non-localized response to a second request to provision the micro-service, the localized response to include a responsive message selected from the messages bundles based on the corresponding locale identifier, the responsive message formatted in a language associated with the corresponding locale identifier, and the responsive message selected from the messages bundles based on the code; and processor circuitry to execute the registrator instructions, the message bundle generator instructions, and the localized response creator instructions.

11. The apparatus of claim 10, wherein the at least one of the locale identifiers identifies a geographical region.

12. The apparatus of claim 10, wherein the micro-service and at least a second micro-service collaborate to perform a macro-service.

13. The apparatus of claim 10, further including a header checker to:

determine whether a third request to provision the micro-service includes a custom header; and when the third request to provision the micro-service does not include the custom header, obtain a corresponding one of the locale identifiers based on a second user profile of a second user associated with the third request.

14. At least one non-transitory computer readable storage medium comprising instructions to cause programmable circuitry to at least:

register a user with a multi-service centralized localization service based on a locale identifier inserted into a header of a first request, the multi-service centralized localization service to process a subsequent request from the user without checking a profile of the user for the locale identifier;

generate messages bundles for a micro-service available in a distributed cloud environment, the messages bundles corresponding to respective different locale identifiers representing different languages in which messages of the corresponding messages bundles are to be formatted; and create a localized response based on at least one of a plurality of codes and at least one of the different locale identifiers, the at least one of the codes and the at least one of the different locale identifiers included in a non-localized response to a second request to provision the micro-service, the localized response to include a responsive message selected from messages in the messages bundles corresponding to the at least one of the different locale identifiers, and the responsive message being a message in the messages bundles corresponding to the at least one of the codes, different messages in the messages bundles corresponding to different codes, the different codes representing respective different possible outcomes of an attempt to provision the micro-service.

15. The at least one non-transitory computer readable storage medium of claim 14, wherein the at least one of the different locale identifiers is to identify a geographical region.

16. The at least one non-transitory computer readable storage medium of claim 14, wherein the micro-service and at least a second micro-service collaborate to perform a macro-service.

17. The at least one non-transitory computer readable storage medium of claim 14, wherein the instructions are to cause the programmable circuitry to:
- determine whether a third request includes a custom header; and
- when the third request does not include the custom header, obtain a corresponding one of the different locale identifiers based on a second user profile of a second user associated with the third request.

18. The at least one non-transitory computer readable storage medium of claim 17, wherein the instructions are to cause the programmable circuitry to determine an identity of the second user associated with the third request when the third request does not include the custom header.

* * * * *